United States Patent
Baker

(10) Patent No.: US 7,380,117 B2
(45) Date of Patent: May 27, 2008

(54) PROCESS AND STREAMING SERVER FOR ENCRYPTING A DATA STREAM

(75) Inventor: Brian Baker, Bellevue, WA (US)

(73) Assignee: Widevine Technologies, Inc., Seattle, WA (US)

( * ) Notice: Subject to any disclaimer, the term of this patent is extended or adjusted under 35 U.S.C. 154(b) by 441 days.

(21) Appl. No.: 11/171,866

(22) Filed: Jun. 30, 2005

(65) Prior Publication Data

US 2006/0059563 A1    Mar. 16, 2006

Related U.S. Application Data

(63) Continuation of application No. 10/109,963, filed on Mar. 29, 2002, now Pat. No. 6,965,993, which is a continuation of application No. 09/436,916, filed on Nov. 9, 1999, now Pat. No. 6,449,719.

(51) Int. Cl.
*H04L 9/32* (2006.01)

(52) U.S. Cl. ..................... 713/153

(58) Field of Classification Search ............ 380/200, 380/203
See application file for complete search history.

(56) References Cited

U.S. PATENT DOCUMENTS

| | | |
|---|---|---|
| 4,535,355 A | 8/1985 | Arn et al. |
| 4,694,489 A | 9/1987 | Frederiksen |
| 5,067,035 A | 11/1991 | Kudelski et al. |
| 5,134,656 A | 7/1992 | Kudelski |
| 5,144,663 A | 9/1992 | Kudelski et al. |
| 5,339,413 A | 8/1994 | Koval et al. |
| 5,375,168 A | 12/1994 | Kudelski |
| 5,487,167 A | 1/1996 | Dinallo et al. |
| 5,539,450 A | 7/1996 | Handelman |
| 5,590,200 A | 12/1996 | Nachman et al. |
| 5,592,212 A | 1/1997 | Handelman |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |

(Continued)

FOREIGN PATENT DOCUMENTS

EP    658054 B1    6/1995

(Continued)

OTHER PUBLICATIONS http://www.ntt.co.jp/news/news02e/0209/020927.html, Sep. 27, 2002.

(Continued)

*Primary Examiner*—Matthew B Smithers
(74) *Attorney, Agent, or Firm*—Darby & Darby P.C.; Jamie L. Wiegand

(57) ABSTRACT

There is disclosed a process for encrypting a data stream to secure the data stream for single viewing and to protect copyrights of the data stream. Specifically, there is disclosed a process for protecting streaming multimedia, entertainment and communications in an Internet-type transmission. There is further disclosed a streaming server component operably connected with a streaming server that interacts with a client system to affect the inventive process.

10 Claims, 6 Drawing Sheets

U.S. PATENT DOCUMENTS

| | | | |
|---|---|---|---|
| 5,774,546 A | 6/1998 | Handelman et al. |
| 5,799,089 A | 8/1998 | Kuhn et al. |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,157,721 A | 12/2000 | Shear et al. |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelmann et al. |
| 6,311,221 B1 * | 10/2001 | Raz et al. .................. 709/231 |
| 6,314,409 B2 | 11/2001 | Schneck et al. |
| 6,314,572 B1 | 11/2001 | LaRocca et al. |
| 6,334,213 B1 | 12/2001 | Li |
| 6,363,488 B1 | 3/2002 | Ginter et al. |
| 6,385,596 B1 * | 5/2002 | Wiser et al. .................. 705/51 |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,449,367 B2 | 9/2002 | Van Wie et al. |
| 6,449,719 B1 | 9/2002 | Baker |
| 6,459,427 B1 | 10/2002 | Mao et al. |
| 6,466,670 B1 | 10/2002 | Tsuria et al. |
| 6,505,299 B1 | 1/2003 | Zeng et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,633,918 B2 | 10/2003 | Agarwal et al. |
| 6,634,028 B2 | 10/2003 | Handelmann et al. |
| 6,640,304 B2 | 10/2003 | Ginter et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,729,549 B2 | 5/2004 | Hamann et al. |
| 6,941,285 B2 | 9/2005 | Sarcanin et al. |
| 7,085,931 B1 | 8/2006 | Smith et al. |
| 2001/0008015 A1 | 7/2001 | Vu et al. |
| 2002/0001385 A1 | 1/2002 | Kawada et al. |
| 2002/0015498 A1 | 2/2002 | Houlberg et al. |
| 2002/0021805 A1 | 2/2002 | Schumann et al. |
| 2002/0089410 A1 | 7/2002 | Janiak et al. |
| 2002/0104004 A1 | 8/2002 | Couillard |
| 2002/0108037 A1 | 8/2002 | Baker |
| 2002/0141582 A1 | 10/2002 | Kocher et al. |
| 2003/0007568 A1 | 1/2003 | Harmery et al. |
| 2004/0117500 A1 | 6/2004 | Lindholm et al. |
| 2004/0151315 A1 | 8/2004 | Kim |

FOREIGN PATENT DOCUMENTS

| | | |
|---|---|---|
| EP | 714204 B1 | 5/1996 |
| EP | 0 852 445 A2 | 7/1998 |
| EP | 0886409 A2 | 12/1998 |
| EP | 182875 A2 | 2/2002 |
| JP | 2001-144802 | 5/2001 |
| JP | 2002-084339 | 3/2002 |
| JP | 2004-048772 | 2/2004 |
| WO | WO-96/06504 A1 | 2/1996 |
| WO | WO-96/32702 A1 | 10/1996 |
| WO | WO-99/21364 | 4/1999 |
| WO | WO-99/28842 | 6/1999 |
| WO | WO-99/30499 A1 | 6/1999 |
| WO | WO-99/54453 A1 | 10/1999 |
| WO | WO-01/93212 A2 | 12/2001 |
| WO | WO-02-21761 A2 | 3/2002 |
| WO | WO-02/084980 | 10/2002 |
| WO | WO-03/092264 | 11/2003 |
| WO | WO-2004/002112 A1 | 12/2003 |

OTHER PUBLICATIONS

Coverage and Generalization in an Artificial Immune System, Balthrop, et al., 2002.

Video Protection by Partial Content Corruption, C. Griwodz, Sep. 1998.

An Overview of Multimedia Content Protection in Consumer Electronics Devices, Eskicioglu et al., date unknown.

Performance Study of a Selective Encryption Scheme for the Security of Networked, Real-Time Video, Spanos et al., 1995.

Irdeto Access and Optibase create Strategic Alliance—Dec. 14, 2000, http://www.irdetoaccess.com/press/0000041.htm.

System Security, Streaming Media, S. Blumenfeld, Oct. 2001.

http://www.cs.unm.edu/~forest/projects.html, Dec. 2, 2003.

Partial Encryption for Image and Video Communication, H. Cheng, 1998.

A Review of Video Streaming Over the Internet, Hunter et al., Dec. 2, 2003.

Standards Track, Schulzrinne, et al., Apr. 1998, pp. 1-86.

http://www.optibase.com/html/news/December_14_2000.html, Dec. 14, 2004.

Omneon Video Networks Product Announcement, Broadband Streaming, pp. 1-4.

Yoshida, Kazuhiro, et al., "A Continuous-media Communication Method for Minimizing Playback Interruption", IS&T/SPIE Conference on Visual Communications and Immage Processing, Jan. 1999, San Jose, California, vol. 3653.

Griwodz, Carsten et al., "Protecting VoD the Easier Way", ACM Mulitmedia, 1998, Bristol, UK, pp. 21-28.

Schylzrinne, H., et al., "RTP: A Transport Protocol for Real-Time Applications", RFC 1889, Jan. 1996, pp. 1-75.

International Search Report dated Oct. 12, 2005.

European Patent Office, Communication dated Jan. 26, 2006 for EP Application No. 05250968.4.

Communication pursuant to Article 96(2) EPC dated Dec. 6, 2006 corresponding to EP Application No. 00986215.2 filed Nov. 9, 2000.
English Translation of Japanese Office Action, "Reason for Rejection", received on Apr. 13, 2007 for corresponding Japanese Application No. 2004-328028.

Wu, Tsung-Li e tal., Selective Encryption and Wateramarking of MPEG Video (Extended Abstract), Feb. 17, 1997 International Conference on Image Science, Systems, and Technology, 10 pgs.

* cited by examiner

PROCESS AND STREAMING SERVER FOR ENCRYPTING A DATA STREAM

CROSS-REFERENCE TO RELATED APPLICATIONS

This is a continuation of U.S. patent application Ser. No. 10/109,963, entitled "Process and Streaming Server for Encrypting a Data Stream,", filed Mar. 29, 2002, now U.S. Pat. No. 6,965,993, which is in turn a continuation of U.S. patent application Ser. No. 09/436,916, entitled "Process and Streaming Server for Encrypting a Data Stream," filed Nov. 9, 1999, now U.S. Pat. No. 6,449,719, under 35 U.S.C. §120 and 37 C.F.R. §1.53(b), each of which are incorporated herein by reference.

TECHNICAL FIELD OF THE INVENTION

The present invention provides a process for encrypting a data stream to secure the data stream for single viewing and to protect copyrights of the data stream. Specifically, the invention provides a process for protecting streaming multimedia, entertainment, and communications in an Internet-type transmission. The invention further provides a streaming server component operably connected with a streaming server that interacts with a client system to affect the inventive process.

BACKGROUND OF THE INVENTION

The Internet has provided another means for communication whereby data can be streamed from a server to a client. The client is responsible for displaying the streamed data, preferably streamed media, to a user. The server is responsible for delivering the data stream to the client. The Real Networks and Microsoft solutions send the data stream via a UDP (a connectionless Internet protocol) along with another connection between the client and the server that controls the transmission of the streamed data. The control connection element functions to stop buffer overruns and can adjust the transmission of the stream to compensate for bandwidth latencies. One problem with this arrangement, however, is that the data that are streamed to the client from the server are unprotected and available to anyone on the network. Therefore, there is a need in the art to better protect from interception across a wide area network, such as the Internet. Specifically, the need relates to providing an ability to protect the improper interception and ability to copy streaming data across the Internet. At present, there is no protection mechanism in place to protect copyrighted data.

Once the data has been released by the server and either received by the user or intercepted before being received by the user, there is no way to restrict the re-transmission of such data once it has been released over a network. Even if the data stream has been copyrighted, there is no means to protect or enforce copyright protection of streamed data. The entity owning the copyright and streaming such content realize that there is no control over what is done with such content after it is released. Therefore, there is a need in the art to provide a means for protecting copyrights in content once streamed over a network. The present invention was designed to address both needs.

Currently, no streaming media solution actually encrypts the data that is being sent from the server to the client. One solution can accomplish this with existing technology, such as by merging SSL secure HTTP sockets with a streaming software package, such as Quicktime. Unfortunately, Quicktime does not have a full screen view option. Therefore, there is a need in the art to develop a better method for streaming video data.

SUMMARY OF THE INVENTION

The present invention provides a process for encrypting a data stream to secure the data stream to enable only single viewing, comprising:

(a) providing a client selection for a streaming data transmission (b) opening a connection to a streaming server and sending URI, token and user information to the streaming server, wherein the streaming server comprises a client data connection module to send data packets to a client, an encryption module to use encryption keys negotiated with the client to encrypt the data stream and operably connected to the client data connection module, and a flow control module for controlling the rate of data stream flow to maintain a full client buffer;

(c) approving or disapproving a valid or invalid, respectively, URI and token combination on a transaction server, wherein the transaction server comprises a client interaction module for connecting a user to the transaction server component, a user verification module having a user database wherein the user verification module is operably linked to the client interaction module and checking for a valid user, and a URI and token creation module operably linked to the user verification module for creating new URIs and tokens in response to user requests; and (d) providing a continuously encrypted data stream to the client if a valid URI and token combination was found.

Preferably, the streaming server component further comprises a read buffer module operable connected with the flow control module for reading in data from a source footage on storage medium. Preferably, the streaming server component further comprises a user interface module operably connected to the file system module or flow control module for setting server options. Preferably, the streaming server further comprises client server component comprising a data stream control protocol module to create an initial connection to the streaming server component, a decryption module to decrypt the incoming data stream, an input buffer module to buffer incoming data streams, and a display control module to control the display of streaming data. Most preferably, the client server component further comprises a display module to display audio and video data.

Preferably, the providing the continuously encrypted data stream step (d) further comprises a user interface module in the streaming server to allow for pausing, stopping, playing or restarting the data stream. Preferably, the transaction server is implemented with ASP scripts for encryption.

The present invention further comprises a streaming server for encrypting a data stream to secure the data stream to enable only single viewing, comprising:

(a) a streaming server component, wherein the streaming server component comprises a client data connection module to send data packets to a client; and encryption module to use encryption keys negotiated with the client to encrypt the data stream and operably connected to the client data connection module, and a flow control module for controlling the rate of data stream flow to maintain a full client buffer; and (b) a transaction server component, wherein the transaction server component comprises a client interaction module for connecting a user to the transaction server component, a user verification module having a user database wherein the user verification module is operably linked to the client interaction module and checking for a valid user, and a URI and token creation module operably linked to the user verification module for creating new URIs and tokens in response to user requests.

Preferably, the streaming server component further comprises a read buffer module operable connected with the flow control module for reading in data from a source footage on storage medium. Preferably, the streaming server component further comprises a user interface module operably connected to the file system module or flow control module for setting server options. Preferably, the streaming server further comprises a client server component comprising a data stream control protocol module to create an initial connection to the streaming server component, a decryption module to decrypt the incoming data stream, an input buffer module to buffer incoming data streams, and a display control module to control the display of streaming data. Most preferably, the client server component further comprises a display module to display audio and video data.

DETAILED DESCRIPTION OF THE INVENTION

Figure 1:
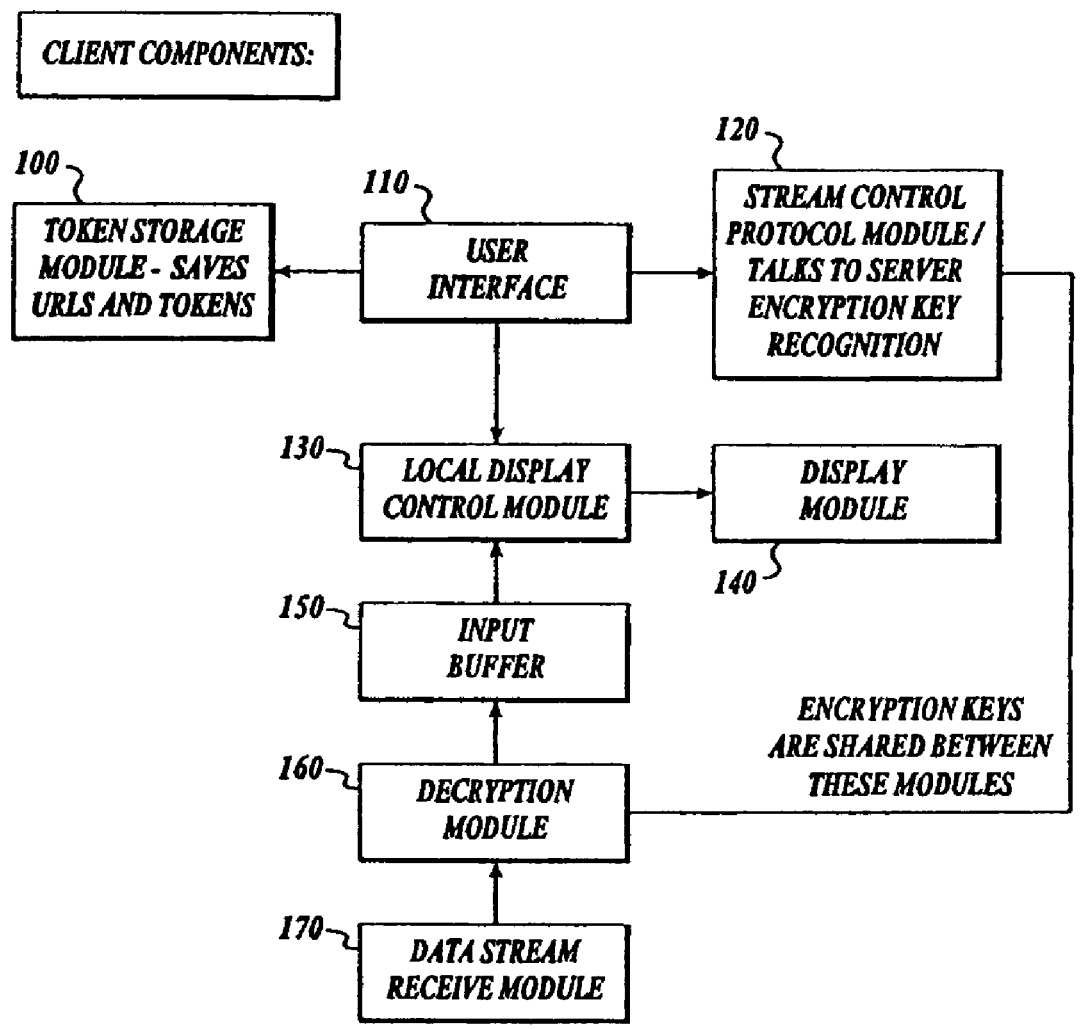
FIG. 1 shows a schematic of the client component enabled to receive and view an encrypted data stream. The client component contains a token storage module 100, a stream control protocol module 120, and a decryption module 160.

The present invention provides a process to encrypt a data stream, such as multimedia entertainment and communications, via the Internet. The encrypted data stream will allow for copyrighted materials and multimedia communications (e.g., analyst meetings) on a secure, pay-per-view basis. The data stream cannot be stored on a client machine for future play-back, or retransmitted. A client, however, can view a data stream as many times as desired within a specified time frame.

A preferred encryption protocol provides, for example, an encryption algorithm of a 192-bit key (e.g., Triple DES), a UDP packet protocol, a RTSP (rfc 2326) packet transmission protocol, an RTP (rfc 1889) packet transmission control protocol, and MPEG1 video storage compression. However, the foregoing example of a preferred encryption protocol will change as such techniques improve with time.

One advantage of the inventive process, using the inventive streaming server and transaction server, is that the client does not really need to possess fully optimized equipment. Only one client will run on any one machine at any one time. The client will need to playback, for example, 30 fps 320×240 video and audio back with no jitter. This will require a stream of about 250~300 kpa, a large data buffer (of at least several megabytes), and a 350 MHz Pentium II processor or greater running Windows 98 or Windows NT.

The server, for example, can be a fully optimized, multi-threaded (thread pool) Windows NT service. Unlike an HTTP server, this allows sessions with clients to be cached and the server will need to maintain state in respects to all clients.

Definitions

The following terms shall be used with the meanings defined herein.

Client shall mean the computer that the data is being sent to.

User shall mean the person executing instructions on the client.

Module shall mean a collection of compiled code designed to perform a specific function.

URI shall mean universal resource identifier, that is, the location on the server of the stream.

Token shall mean a binary piece of information that describes the permissions the user has for a specific stream.

In a preferred embodiment of the inventive process and streaming server, the video will be stored unencrypted on the server machines; the files will only be retrievable through the server software. The inventive server will be responsible for (1) negotiating a set of encryption keys; and (2) encrypting the video data "on the fly" thereby making the data packets that are actually going over the wire useless to any computer other than the intended machine. A preferred encryption standard is TRIPLE-DES with a 168-bit key. This form of encryption is not currently exportable outside of the US and Canada and is extremely secure. The server will use UDP for transmission of the data. This protocol uses considerably less network resources than other TCP protocols (http for example).

Client software will be responsible for decrypting the video data and playback. The encryption keys used will be different every time a movie is accessed. Every time the client is executed, a different encryption key is created so the client cannot play back earlier streams if they were somehow saved to disk.

Flow Charts

With regard to FIG. 1, this shows a schematic of the client component of the inventive process and streaming server enabled to receive and view an encrypted data stream. The client keeps a list of all current streams and the corresponding tokens. This information is stored on the token storage module 100. This list will consist of the following three items: (1) the URI, (2) the token for that URI, and (3) the expiration date given by the server. It is not desirable for the client to have any way of determining if the token is valid or not. Because of this, and the need to remove out of date tokens, the server returns the expiration date. This information is used by the client to display information. The expiration date itself never sent back to the server and the server verifies that the token passed is valid. Examples of module devices that can be used as token storage modules include, for example, Random Access Memory, secondary storage (hard disk), and embedded with software providing for token storage inventory and tracking of expiration dates.

The client communicates with a user interface 110. The client will have a standard user interface that will give the appropriate user experience. The interface will have the ability to look through current valid streams or to connect to the server to search for other streams that could be viewed. The client user interface 110 communicates with a local display control module 130 and a stream control protocol module 120. The client has to be able to setup a communications session with the server as well as control the flow of data from the server once the stream is being viewed. The stream control protocol module 120 creates the initial connection by connecting to the server, passing the requested URI, Token, and user information. The stream control protocol module 120 then negotiates a set of encryption keys and controls the flow of data from the server. Examples of stream control protocol module devices 120 within a client component that can be used to negotiate a set of encryption keys and control the flow of data from a server include, for example, Random Access Memory and the network interface card or modem. The software that will be uploaded into this module will monitor the rate of the data being received by sending network statistics to the streaming server. The display control module 130 controls the display of the data, and has the ability to pause, stop, or re-start the video stream. Examples of display control modules suitable for use within the client component include, Random Access Memory and the video card. The software running in this module will convert the data being sent form the server into a format that can be displayed to the user.

The display module 140 displays video and audio data. The input buffer module 150 is a module that contains the stream buffer. The stream buffer contains a circular buffer of decrypted data that the display control modules reads from and the decryption module writes to. Examples of stream buffer module devices that can be used to contain a circular buffer of decrypted data include, for example, Random Access Memory. As packets are being received from the server, before the data is put into the input buffer, the data within the transport packet is decrypted by a decryption module 160 using the keys negotiated by the stream control protocol module 120. A decryption module is available commercially, for example, SSL, DES, and RSA are available and suitable for use as a decryption module. Lastly on the client component sides is a data stream receive module 170. This module handles the reception of the data packets sent by the server.

Appropriate module devices that can be used as a data stream receive module within the client component includes, for example, Random Access Memory. The software contained in this module will save the data being received by the client in a format that can be used by subsequent modules.

Figure 2:
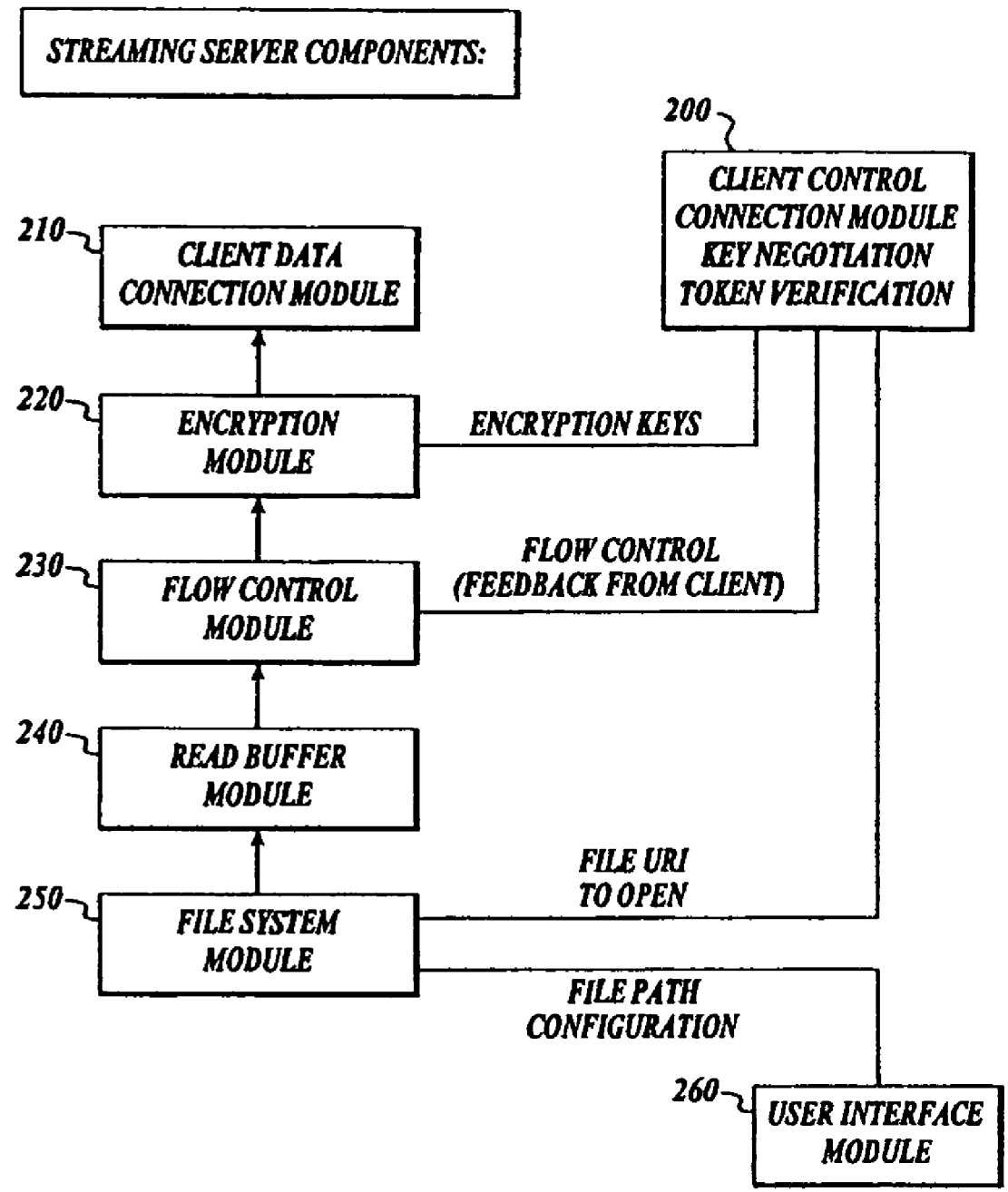
FIG. 2 shows a schematic of the streaming server component having an encryption module 220 and a client control connection module for key negotiation and token verification 200.

With regard to FIG. 2, the client control connection module 200 will handle control communications between the client and the server. The client and server will negotiate a set of encryption keys. The client will send user information, the URI, and the token to the streaming server via the client control connection module 200. From this module 200, the data that is streamed to the client can be controlled (that is, paused, stopped, or restarted). Hardware devices suitable for use as a client control connection module within the streaming server include Random Access Memory. Such hardware components allow for the execution of hardware non-specific operations. Such software is either embedded in the client control connection module or uploaded therein. The software functions to create a process wherein the client and server communicate current network conditions and modify the data stream accordingly.

The client data connection module 210 functions to send data packets to the client using a connectionless protocol to reduce server overhead. Hardware devices suitable for use as a client data connection module within the streaming server include Random Access Memory and Network Interface Cards. Such software is either embedded in the client data connection module or uploaded therein. The software functions to create a process wherein the encrypted data is sent via network packets to the client machine.

The encryption module 220 uses the keys negotiated by the client/server to encrypt the data stream as it is being sent to the client. This allows for "on the fly" encryption and the encryption keys will be unique for all client/server connections. This allows the source footage to be stored unencrypted on the server. Hardware devices suitable for use as an encryption module within the streaming server include Random Access Memory and proprietary hardware encryption devices. Such hardware components include software that functions that do the actual encryption of the data. Such software is either embedded in the encryption module or uploaded therein. The software functions to create a process wherein the data being sent to the device is encrypted with the keys originally negotiated with the client and the output data is of a format that can only be read after being decrypted by the client.

The flow control module 230 makes sure that the data stream is being sent to the server at the rate in which the client is using the data. The buffer at the client needs to be full at all times but streaming data must also not be overwritten. Thus, the flow control module communicates with both the encryption module 220 and uses feedback obtained from the client control connection module 200. Hardware devices suitable for use as a flow control module within the streaming server include Random Access Memory. Such software is either embedded in the flow control module or uploaded therein. The software functions to create a process wherein the flow of data from the server to the client is regulated.

The file system read buffer 240 is for server performance. Small amounts of data read in from the file will be stored in memory instead of having a constant open file on the file system. The file system module 250 is responsible for reading in data from the source footage on the storage medium. The file system module communicates with the client control connection module 200 to open URIs and the user interface module 260 to file path configurations. Hardware devices suitable for use as a file system module within the streaming server include Random Access Memory. Such hardware components include software that functions to allow the access to data streams. Such software is either embedded in the file system module or uploaded therein. The software functions to create a process wherein the data stored on the secondary storage device can be loaded into Random Access Memory to be delivered to the encryption module.

The streaming server further provides a simple user interface module 260 for setting server options such as which network port to bind to and the location of source footage. Hardware devices suitable for use as a file system module within the streaming server include Random Access Memory. Such software is either embedded in the file system module or uploaded therein. The software functions to create a process wherein the user of the server software can tell the file system module where to go to find the data streams.

Figure 3:
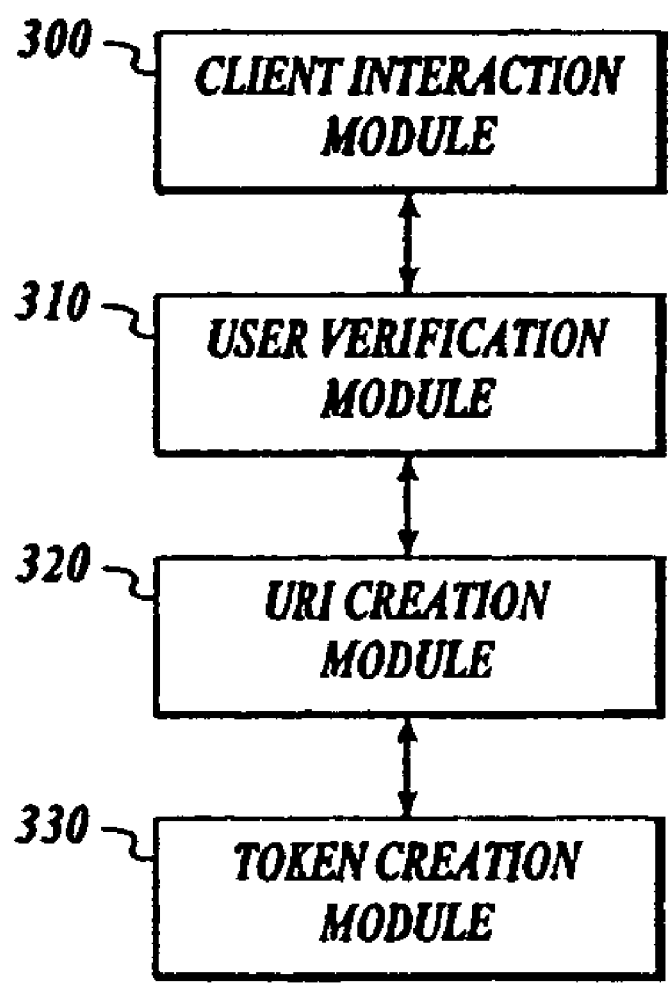
FIG. 3 shows a schematic of the transaction server components having a token creation module 330 and a user verification module 310.

With regard to FIG. 3, the transaction server comprises four module components. To access a video stream, the client must first obtain a transaction token. The transaction token is based on a pay-per-view scheme in which the token will be valid for a certain time period. The time a token is valid for is dependent on what the user selects and what options are available for the selected stream. The user contacts the transaction server, via a client interaction module 300, with the user information and the URI. The transaction server will determine what time options are available for the token and present that to the user. After the user selects the required time limit, the request is passed off to the user verification module 310. Hardware devices suitable for use as a client interaction module within the transaction server include Random Access Memory. Such software is either embedded in the client interaction module or uploaded therein. The software functions to create a process wherein the user information is verified against the database and a valid token is created based upon the options requested by the user.

The user verification module 310 checks for user information passed against a user database to see if the user is valid or not. The user database resides in memory of the user verification module. Hardware devices suitable for use as a user verification module within the transaction server include Random Access Memory. Such software is either embedded in the user verification module or uploaded therein. The software functions to create a process wherein the token passed are verified. The URI creation module 320 and the token creation module 330 are tied together and the token is based upon the request URI. This means that the token is unique to the request URI and cannot be used for any other stream. This information is then passed back to the client via module 300. Hardware devices suitable for use as a URI creation module and token creation module, each located within the transaction server, include NA. Such hardware components include software that functions to Random Access Memory. Such software is either embedded in the URI creation module or token creation module or uploaded therein. The software functions to create a process wherein a valid URI to the media stream the user selected are created.

Figure 4:
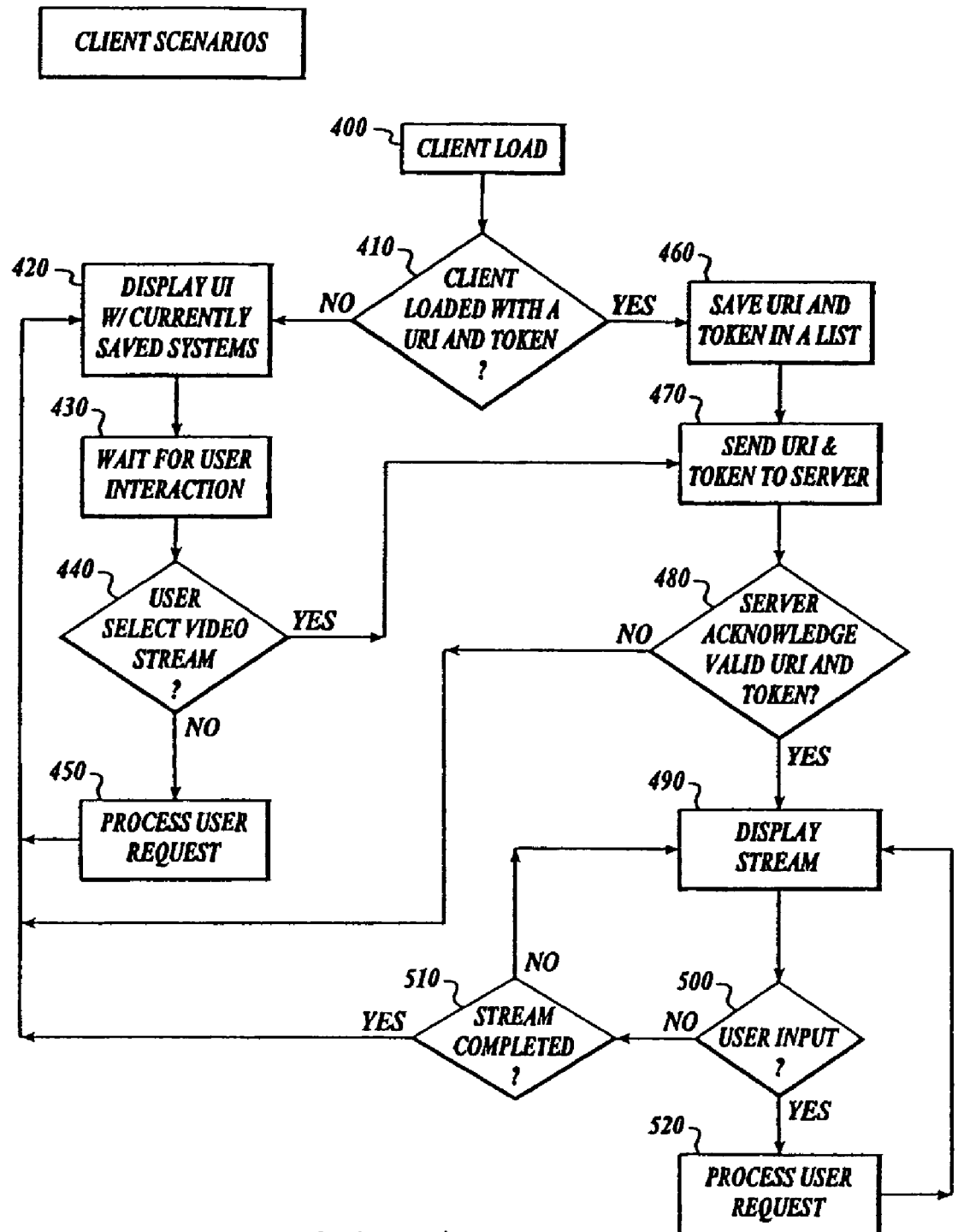
FIG. 4 shows a schematic of various client scenarios showing the need for a token in order to unlock (decrypt) a data stream for viewing.

With regard to FIG. 4, the client 400 executes and the client is loaded with a URI and a token 410. The client either double clicks on the client's icon (no) or it launched by a media server (yes). If the media server launched the client, there will be a request URI and token in the command-line parameters of the client. A display a window (420) lists all the purchased (and current) data (video) streams available to view. The user will be able to select a data stream to view by double clicking on the title of the stream. The screen waits for input from the user (430) and the user selects a data stream or another housekeeping option (440). If a housekeeping option was selected, execute user request (450) and go back to displaying video streams with module 420.

If the user launches a data stream (selects yes from 410) a URI and token is saved in the purchased video streams list so it can be viewed again at a later time 460. A connection to the streaming server is opened and the URI, token and user information is sent to the streaming server 470. The streaming server acknowledges a valid (or invalid) URI and token combination 480. If the token is invalid or has expired, the server will close the connection and the client will go back and display all the data streams that are available to view. If the server acknowledges a valid URI and token combination, the client will start to receive data from the streaming server and display it 490.

If the data stream finishes or the user selects any of the available stream options such as pause, stop, play, or restart 500, the stream will stop and await further user input. If the stream has finished playing 510, the process goes back to the list of available streams 420, or continues displaying the data stream 490 by processing a user request 520 and then going back to displaying the stream 490.

Figure 5:
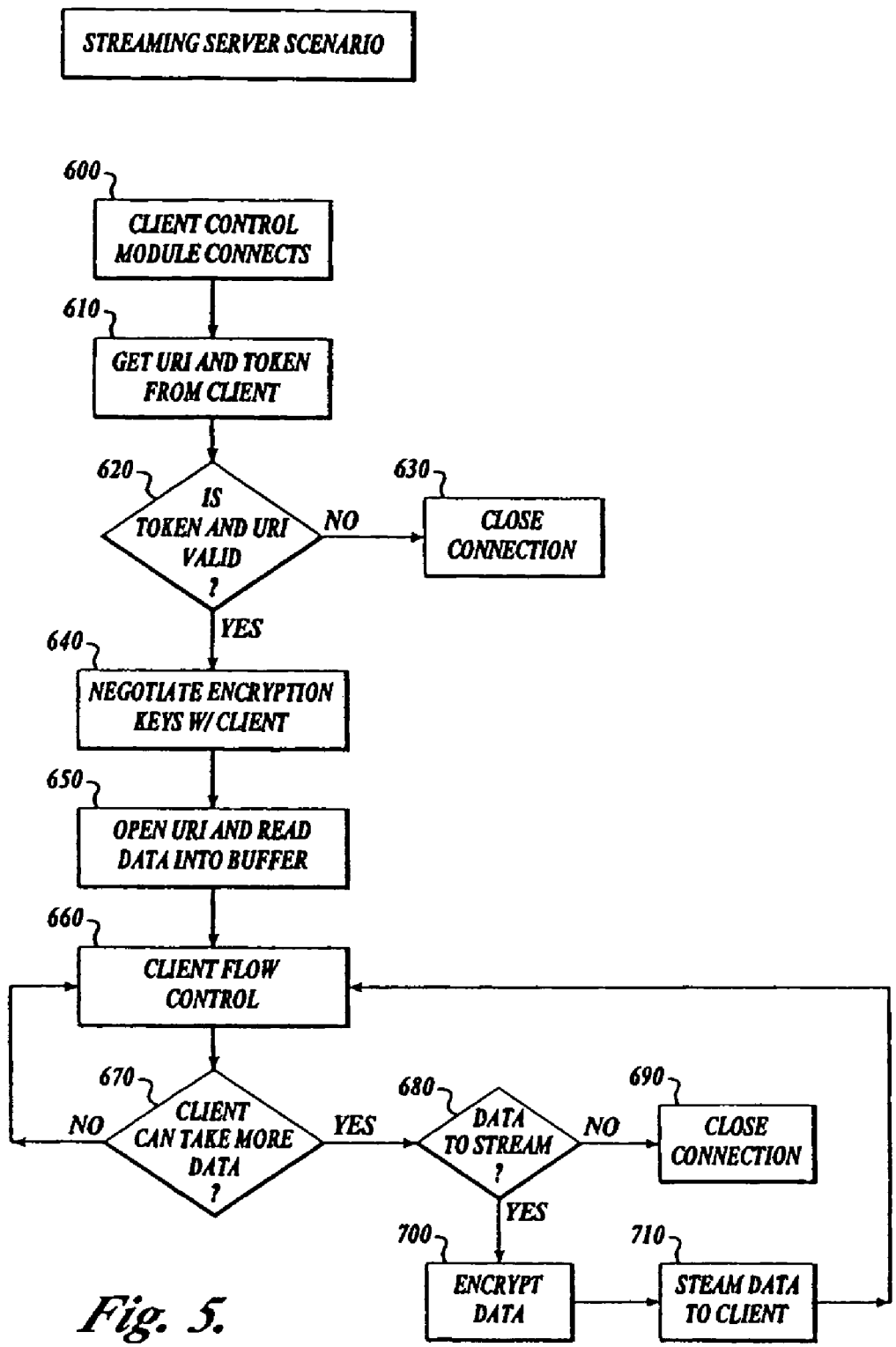
FIG. 5 shows a schematic of the process for the streaming server showing the receipt of a client token triggering a negotiation of encryption keys to allow viewing and receipt of a data stream.

With regard to FIG. 5 and the process run by the streaming server, there is first a connection with the client control module 200, 600 to allow the client to establish a connection with the streaming server. The client will provide the URI, token and user information 610 from user 470. The streaming server determines if the token and URI are valid 620. If the token is invalid or has expired, the connection to the client will be closed with an appropriate error message 630. If token is valid, a set of unique encryption keys will be negotiated with the client 640. A URI will be opened and streaming data will be read into a buffer 650.

The client flow control module 230 provides for the client and streaming server to have a flow control connection established to make sure that the data stream is leaving the streaming server at the same rate it is being used at the client end 660. This addresses bandwidth issues as well as making sure that the client play buffer is not overwritten. Therefore, the client flow control mechanism 660 uses the client flow control module 230 to obtain feedback from the data buffer in the client 710 and control the rate of the data stream to keep the client buffer as full as possible. If the client cannot accept any more data at this time, return to flow control module so indicates 670 to slow down or pause the streaming data. If the client can accept more data 680, the client flow control will first determine if there are more data to stream 680. If there are no more data to stream, the data stream could be completed, and the client connection will be closed 690. If there is more data to be sent, the data waiting in the send buffer will be encrypted 700 and those data in the send buffer will be sent to the client 710.

Figure 6:
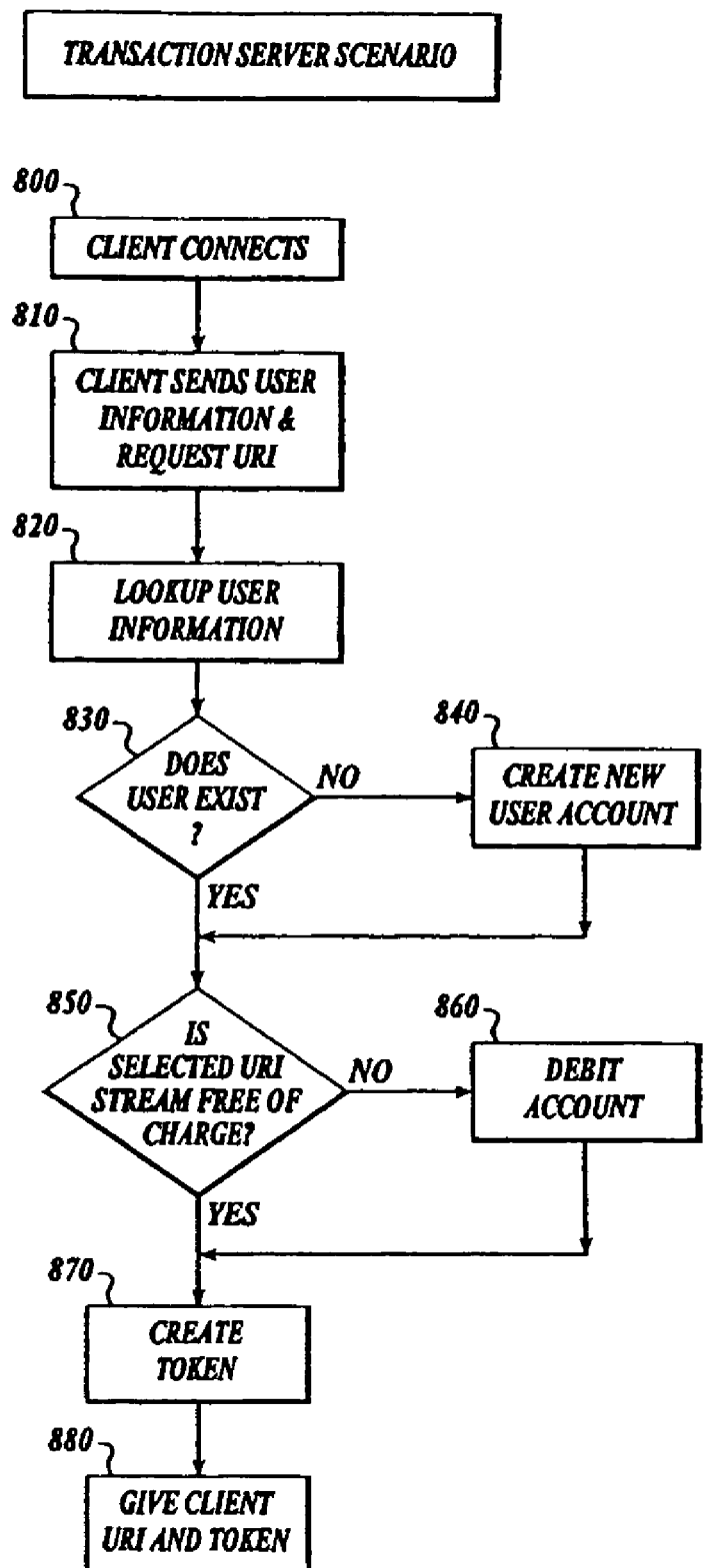
FIG. 6 shows a schematic of the transaction server process providing for setting up of client accounts and token creation.

With regard to FIG. 6 at the transaction server, the client first connects to the transaction server, for example through a web page 800. Preferably, the transaction server will be implemented with ASP scripts. The client sends request URI and user information through ASP command-line arguments 810 and the transaction server user verification module 310 will determine the time limits of available tokens and display to user for selection. The transaction server will look up user information 820 in a database in the user verification module 310. Examples of looking up user information are whether or not a user has an account (exists according to the transaction server) 830. If the user does not have an account 840, a transaction will be opened up to create new account page and get information from the user 840. In addition, the transaction server user verification module 310 will determine if the URI that was requested is free of charge 850. If the URI costs money 860, the transaction server user verification module 310 will debit a credit card that is in the user database. This process will create a URI in the URI creation module 320 of the transaction server.

Once a URI is provided and either paid for or provided free, a token will be created 870 in the token creation module 330. The token now created will be linked with the URI and a time limit will be selected 880. Lastly, the viewer will be started on the client machine and sent back to the client along with the URI and the created token.

What is claimed as new and desired to be protected by Letters Patent of the United States is:

1. A client for receiving a data stream for use in a predefined number of viewings, comprising:
   a control module that is programmed to perform actions comprising:
   providing a URI and a token associated with the URI, and a request for the data stream to a server; and
   if the URI, and token are validated:
   negotiating an encryption key with the server, receiving the data stream over a network a rate of a flow to maintain a substantially full client buffer, using the encryption key to decrypt the data stream; and a display module that is configured to control the display of the data stream.

2. The client of claim 1, wherein the encrypted data stream is encrypted for a single viewing.

3. The client of claim 1, wherein at least a portion of computer-readable instructions associated with the control module is uploadable onto the client.

4. The client of claim 1, wherein if the URI, and token are validated further comprises employing the server to determine if the token has expired.

5. The client of claim 1, wherein the control module is programmed to perform actions further comprising:

sending user information and the request for the data stream to the server; and if the user information is valid, performing additional actions, including:

if a fee is associated with the requested data stream, debiting a valid user account, and generating the token.

6. A server for use in providing a data stream to a client for a predetermined number of viewings, the server comprising:

a first component configured to enable a connection to be established with the client; and a second component that is programmed to perform actions comprising:

receiving user verification information, URI, and a token associated with the URI with a request for the data stream from the client;

determining the validity of the user verification information, the URI, and the token, wherein the token is validated based, in part, on an expiration date; and if the user verification information, URI, and token are valid, negotiating an encryption key with the client, using the encryption key to encrypt the data stream as it is streamed to the client, and controlling over a network a rate of a flow of the encrypted data stream to the client to maintain a substantially full client buffer.

7. The server of claim 6, wherein the predetermined number of viewings is a single viewing.

8. The server of claim 6, wherein controlling over the network the rate of the flow further comprises transmitting the encrypted data stream to the client at substantially the same rate as the encrypted data stream is received by the client.

9. The server of claim 6, wherein controlling over the network the rate of the flow further comprises receiving a network statistic from the client.

10. An apparatus for providing a data stream, comprising:

a means for receiving user information, including a token associated with a URI for a request for the data stream from a client;

a means for determining a validity of the user information and the token; and if the user information and the token are valid, employing:

a means for negotiating an encryption key with the client;

a means for encrypting the data stream as it is streamed to the client, wherein the data stream is encrypted with the negotiated encryption key; and a means for controlling by the apparatus over a network a rate of a flow of the encrypted data stream to the client to maintain a substantially full client buffer.

* * * * *